United States Patent [19]

Skinner et al.

[11] 4,158,781
[45] Jun. 19, 1979

[54] TRANSMIT RECEIVE SOLID STATE SWITCH FOR ELECTROACOUSTIC TRANSDUCERS

[75] Inventors: Dale D. Skinner; John H. Thompson, both of Saverna Park, Md.

[73] Assignee: The United States of America as represented by the Secretary of the Navy, Washington, D.C.

[21] Appl. No.: 873,325

[22] Filed: Jan. 30, 1978

[51] Int. Cl.² ............................................. G05F 1/44
[52] U.S. Cl. ........................................ 307/99; 307/100; 325/22; 340/3 R; 181/139
[58] Field of Search ................. 307/112, 99, 100, 126, 307/130, 318; 181/139, 140; 340/3 A; 343/178, 180; 325/22, 23; 333/13; 380/3 R

[56] References Cited

U.S. PATENT DOCUMENTS

| | | | |
|---|---|---|---|
| 3,414,872 | 12/1968 | Barron | 340/3 R |
| 3,436,683 | 4/1969 | Rogers | 307/318 |

Primary Examiner—L. T. Hix
Assistant Examiner—S. D. Schreyer
Attorney, Agent, or Firm—R. S. Sciascia; A. L. Branning; G. J. Perry

[57] ABSTRACT

A solid state transmit-receive switching element having multiple resonant circuits connected in a bridge arrangement by back-to-back zener diodes. While receiving, the zener diodes have a high impedance and the bridge arrangement acts as two series tuned circuits in parallel. While transmitting, the zener diodes breakdown and the bridge arrangement appears electrically as two parallel tuned circuits in series.

5 Claims, 3 Drawing Figures

TRANSMIT RECEIVE SOLID STATE SWITCH FOR ELECTROACOUSTIC TRANSDUCERS

BACKGROUND OF THE INVENTION

This invention relates generally to transmit-receive switching for use with electroacoustic transducers and more particularly to passive networks for accomplishing such switching.

FIG. 1 illustrates a typical electroacoustic transducer array 10 having a common buss driven by a transmitter 14 through a mechanical transmit-receive switch 12. Typically, the noncommon end of each transducer 10 is tied to ground through a shading transformer 18. Individual windings on these shading transformers are connected by beam pattern circuitry to obtain desired beam patterns for signal processing. Across each transformer 18 are shading transformer zener diodes 20 which are intended to breakdown during transmission and limit the voltage and current to each such transformer. When the array of transducer 10 is operating in the transmit mode, the common buss 16 is tied to transmitter 14 through switch 12. In the receive mode, switch 12 grounds the common buss 16 and provides a short circuit across transmitter 14 which is not operating. Thus, in the receive mode, the individual receiving voltage of each transducer element of the array 10 is applied to its respective shading transformer 18.

Networks designed to take the place of mechanical transmit-receive switch 12 have been designed according to the general scheme illustrated in FIG. 2. Transmitter 14 is connected to a series switching element 22. A parallel switching element 24 is connected from the electrical junction of the output of series element 22 with common buss 16 to ground. Series element 22 is generally a plurality of silicon controlled rectifiers in bridge arrangement such that they will breakdown under power generated by transmittter 14 and present a high impedance to isolate the transmitter when it is not operating (in the receive mode).

Parallel switching element 24 on the other hand must present a high impedance at high drive levels during the transmit mode operation and a low impedance for low drive levels during receive mode operation. Switching element 24 must have sufficiently high impedance during transmit mode that transmitter 14 will not be loaded by the switching element in addition to transducers 10. In addition, this parallel switching element 24 must have low enough impedance during receive mode operation so that it will effectively ground common buss 16 at the operating frequency to prevent mutual paths among transducer elements resulting in beam pattern alterations and their associated decrease in side lobe supression.

SUMMARY OF THE INVENTION

Accordingly, the present invention provides a parallel switching element for use in passive network transmit-receive switching of electroacoustic transducers. Two tuned circuit networks are coupled in bridge arrangement by a pair of back-to-back zener diodes intended to breakdown during transmission. Operating in the receive mode, with the zener diodes appearing open, the switching element will appear as two series tuned circuits operating in parallel between the transducer array and ground, thereby creating an effective ground for the array. In the transmit mode, the zeners breakdown and cause the switching element to appear as two parallel tuned circuits at the operating frequency in series between the transducer array and ground thereby providing effective isolation of the transducer array.

OBJECTS OF THE INVENTION

It is therefore an object of the present invention to provide a transmit-receive switch for use with electroacoustic transducers.

A further object of the present invention is to provide a transmit-receive switching element that is totally passive.

Another object of the present invention is to provide a passive network exhibiting high impedance at high power levels and low impedance at low power levels.

Still another object of the present invention is to provide a passive transmit-receive switching element that at low power levels exhibits at least a ten percent bandwidth.

BRIEF DESCRIPTION OF THE DRAWINGS

Other objects and many of the attendant advantages of the present invention will be readily apparant as the invention becomes better understood by reference to the following detailed description with its appended claims, when considered in conjunction with the drawings wherein:

DESCRIPTION OF THE PREFERRED EMBODIMENTS

Figure 1:
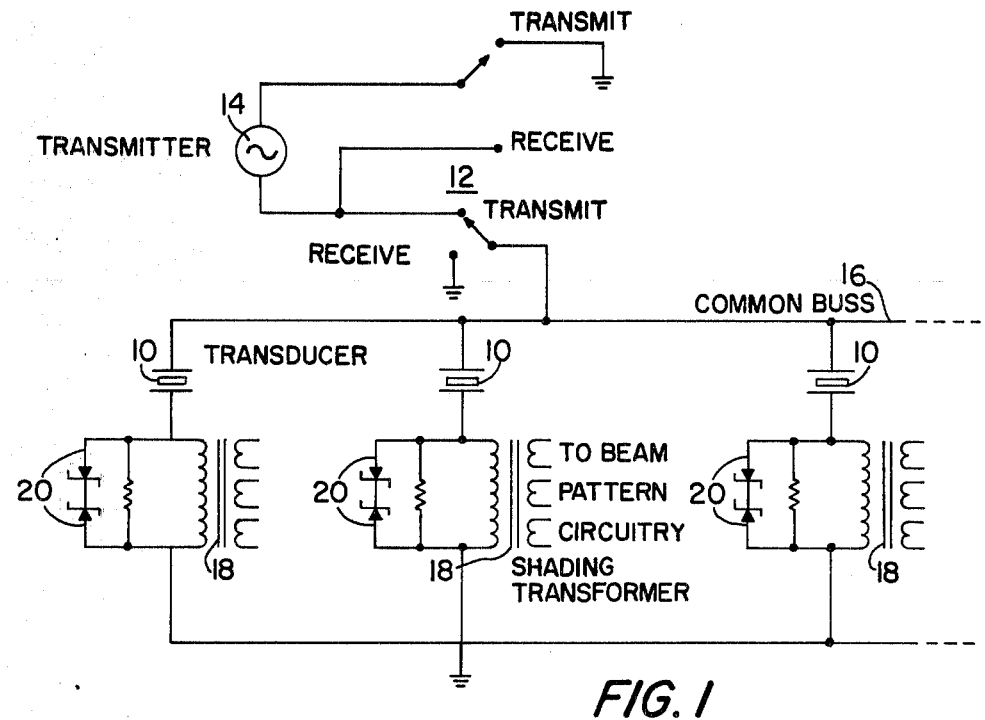
FIG. 1 is a schematic diagram of a typical elecroacoustic transducer array using a mechanical transmit-receive switch.
Figure 2:
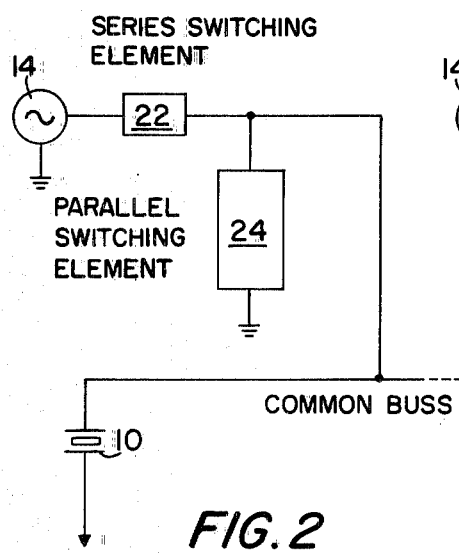
FIG. 2 is a circuit block diagram of the general design scheme for passive transmit-receive networks.
Figure 3:
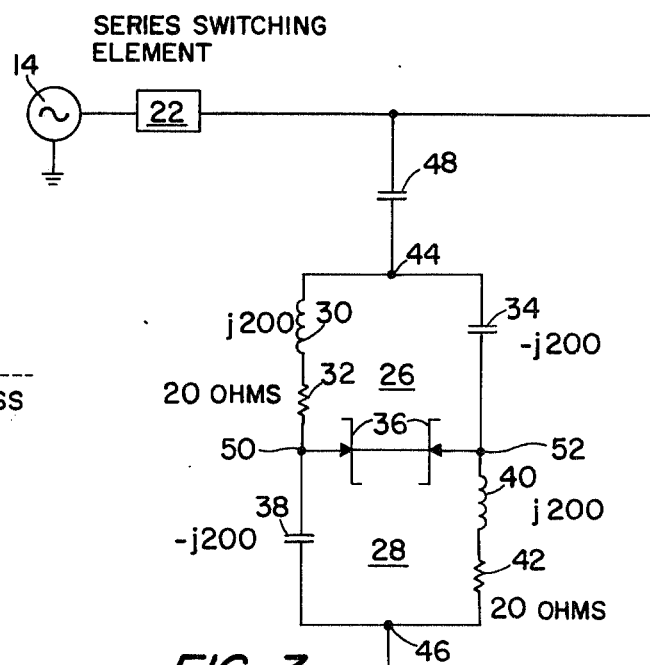
FIG. 3 is a detailed schematic diagram of the parallel switching element according to the present invention.

Referring now to the drawings, wherein like reference characters designate like or corresponding parts throughout, applicant's highly effective parallel switching element 24 is schematically detailed in FIG. 3. Two tuned circuit networks 26 and 28 are coupled in bridge arrangement by a zener diode pair 36, coupled back-to-back at their cathodes. This zener diode means for coupling these tuned networks in power sensitive with switching occurring at the breakdown point of the zeners.

When the parallel switching element 24 is operating in the receive mode, the back-to-back zeners 36 are electrically open. The entire switching element 24 appears electrically as two series tuned circuits in parallel between an input port 44 and an output port 46. The first such series tuned circuit is the series combination of an inductor 30, resistor 32, and capacitor 38. Inductor 30 and capacitor 38 values are chosen such that they have the same magnitude of reactance at the operating frequency. The second series turned circuit electrically in parallel with the first in this receive open zener mode is the series combination of capacitor 34, inductor 40, and resister 42. Circuit values for capacitor 34 and inductor 40 are required to be the same as those of capacitor 38 and inductor 30 respectively for proper operation in the transmit mode later described.

It is basic that at the operating frequency, a series tuned circuit will appear as a short (or as a pure resistance if there is resistance present as in the instant design). In the particular design shown in FIG. 3, inductors 30 and 40 were selected to have an inductive reactance of j200 and capacitors 34 and 38 were selected to have a capacitive reactance of −j200. Series resistors 32 and 42 were each chosen to be twenty ohms. These values were selected to obtain a good compromise between having a low impedance at low drive levels and a high impedance at high drive levels while maintaining a useable bandwidth. Therefore, operating in the receive mode, parallel switching element 24 appears electrically as two twenty ohm resistors in parallel, thereby presenting ten ohms non-reactive resistance between input port 44 and output port 46. The values selected and shown in the figures were chosen for a particular design, and the spirit of the invention would not be undermined by the selection of other values appropriate to differing use constraints imposed upon the designer.

When high power is applied in the transmit mode, zener diode pair 36 breaks down and causes a short circuit to appear at the bridge junction of networks 26 and 28. Such a short between nodes 50 and 52 noted on FIG. 3 caused parallel switching element 24 to appear electrically as two parallel tuned circuits operating in series. The first such parallel tuned circuit is the parallel combination of inductor 30 with capacitor 34 and the second such parallel combination being the combination of inductor 40 with capacitor 38. This series combination of parallel tuned circuits will naturally present a high impedance at the operating frequency.

Depending upon the zener diodes selected for a particular application, it may be necessary to compensate for their internal reactance. A compensating capacitor 48 coupling the input port 44 of parallel switching element 24 to the series switching element 22 can be selected for such compensation at the operating frequency.

The magnitude of impedance selected for any particular parallel switching element 24 will naturally depend on the power levels of operation and load characteristics of transducer array 10. In the particular design schematically detailed in FIG. 3, the receiving low level impedance over ten percent bandwidth had a magnitude range of 16 ohms at the center of the band to 84 ohms at the three dB bandwidth. Sending voltamperes for 1000 volt transmitter drive were as shown in the chart below:

| FREQUENCY | RECEIVING IMPEDANCE | SENDING VOLTAMPERES FOR 1000 VOLT DRIVE |
| --- | --- | --- |
| $.95f_o$ | 84 | 1180 |
| $1.0f_o$ | 16 | 1250 |
| $1.05f_o$ | 84 | 1310 |

A tradeoff exists between the receiving impedance and the sending voltamperes. To reduce the voltampere drive requires that the receiving impedance must be increased and conversely to reduce the receiving impedance requires an increase in the voltampere drive.

Obviously, other embodiments and modifications of the present invention will readily come to those of ordinary skill in the art having the benefit of the teachings presented in the foregoing description and drawings. It is, therefore, to be understood that this invention is not to be limited thereto and that said modifications and embodiments are intended to be included within the scope of the appended claims.

What is claimed and desired to be secured by Letters Patent of the United States is:

1. A two terminal switching element having low impedance below a predetermined input low signal level and high impedance above a second predetermined high signal over a predetermined passband of signal frequencies comprising:
    an input port;
    a first parallel circuit tuned to said passband frequencies series coupled to said input port;
    an output port;
    a second parallel circuit tuned to said passband frequencies series coupled to said output port;
    means for coupling in bridge configuration said first parallel tuned circuit with said second parallel tuned circuit such that said means for coupling will present an open circuit below said low signal level and will present a short circuit above said high signal level.

2. The switching element of claim 1 wherein said means for bridge coupling is a pair of zener diodes having their respective cathodes or anodes coupled to one another.

3. The switching element of claim 2 further including a capacitor series connected between said first parallel tuned circuit and said input port said capacitor having a value selected to compensate for the internal capacitance of said zener diodes.

4. A two terminal switching element comprising:
    an input port;
    an output port;
    a first inductor having first and second ends, said first end of said inductor being coupled to said input port;
    a first resistor having first and second ends, said first end being coupled to said second end of said first inductor;
    a first capacitor having first and second ends, said first end of said first capacitor being coupled to said input port;
    a pair of zener diodes connected back-to-back at their respective cathodes and having a first anode end and a second anode end, said first anode end being coupled to said second end of said first resistor and said second anode end being coupled to said second end of said first capacitor;
    a second capacitor having first and second ends, said first end of said second capacitor being coupled to said second end of said first resistor and said first anode end of said zener diode pair and said second end of said second capacitor being coupled to said output port;
    a second inductor having first and second ends, said first end of said second inductor coupled to said second end of said first capacitor and to said second anode end of said zener diode pair;
    a second resistor having first and second ends, said first end coupled to said second end of said second inductor and said second end of said second resistor coupled to said output port;

5. The switching element of claim 4 further including a compensating capacitor coupling the junction of said first inductor with said first capacitor to said input port, said compensating capacitor having a value selected to compensate for the internal circuit capacitance of said zener diode pair.

* * * * *